United States Patent [19]

Hahn

[11] 3,708,041
[45] Jan. 2, 1973

[54] BRAKE
[75] Inventor: Emil H. Hahn, St. Joseph, Mich.
[73] Assignee: Lambert Brake Corporation, St. Joseph, Mich.
[22] Filed: Feb. 11, 1971
[21] Appl. No.: 114,414

[52] U.S. Cl.............................188/72.9, 188/73.4
[51] Int. Cl............................................F16d 55/224
[58] Field of Search...........188/72.6, 72.9, 72.3, 73.4

[56] References Cited

UNITED STATES PATENTS

| 2,966,964 | 1/1961 | Brueder | 188/72.6 X |
| 3,349,871 | 10/1967 | Walther et al. | 188/73.3 |
| 2,373,572 | 4/1945 | Lambert | 188/72.6 |
| 3,335,820 | 8/1967 | Burnett | 188/73.4 X |
| 3,499,508 | 3/1970 | Swift | 188/72.9 |
| 3,545,573 | 12/1970 | Barton | 188/72.9 |

Primary Examiner—George E. A. Halvosa
Attorney—Olson, Trexler, Wolters & Bushnell

[57] ABSTRACT

A brake comprises a ring-shaped housing formed of sheet metal halves secured together and forming openings for receiving pins. The pins slidably support braking plates that are normally biased apart and are movable for engagement with the opposite surfaces of a brake disc. The housing halves also provide an opening for receiving an actuating lever that is engageable with one of the braking plates. The housing may be shiftably mounted on a fixed mounting plate for use with an axially fixed rotating disc, or the housing may be fixedly mounted for use with an axially shiftable brake disc.

8 Claims, 7 Drawing Figures

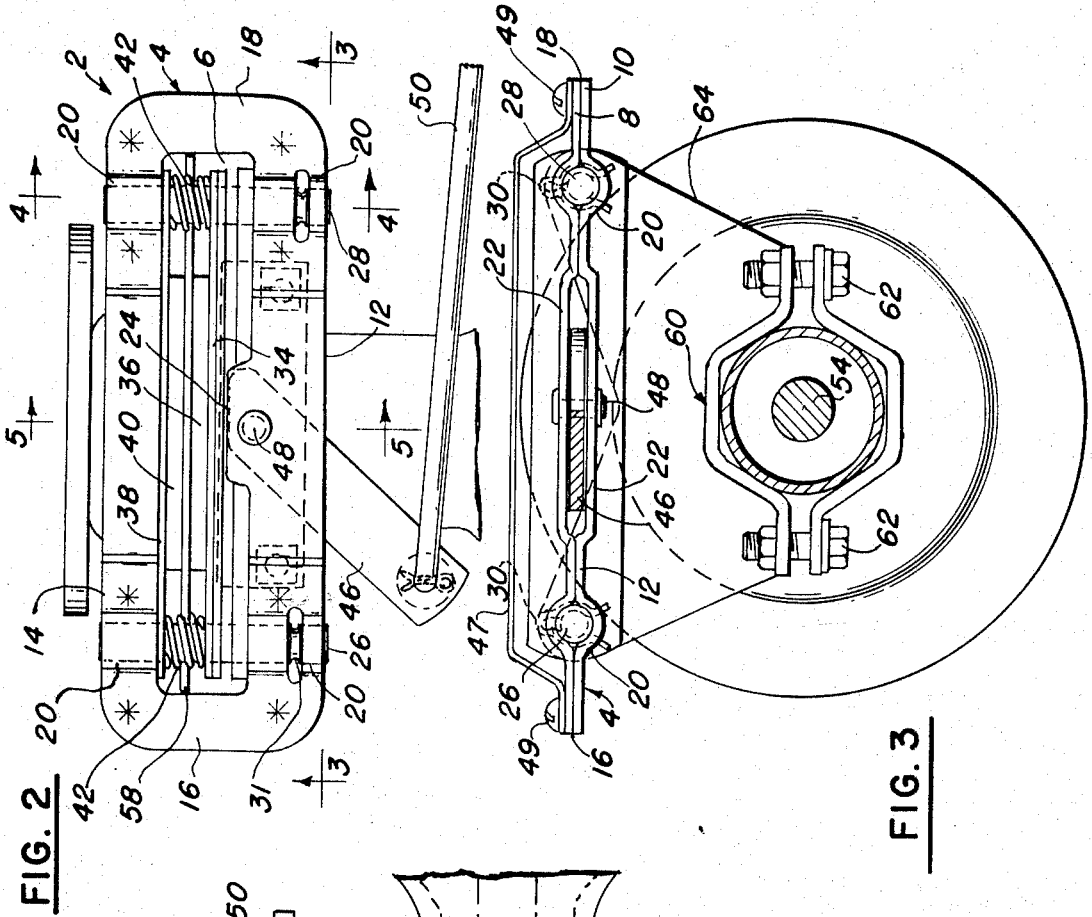
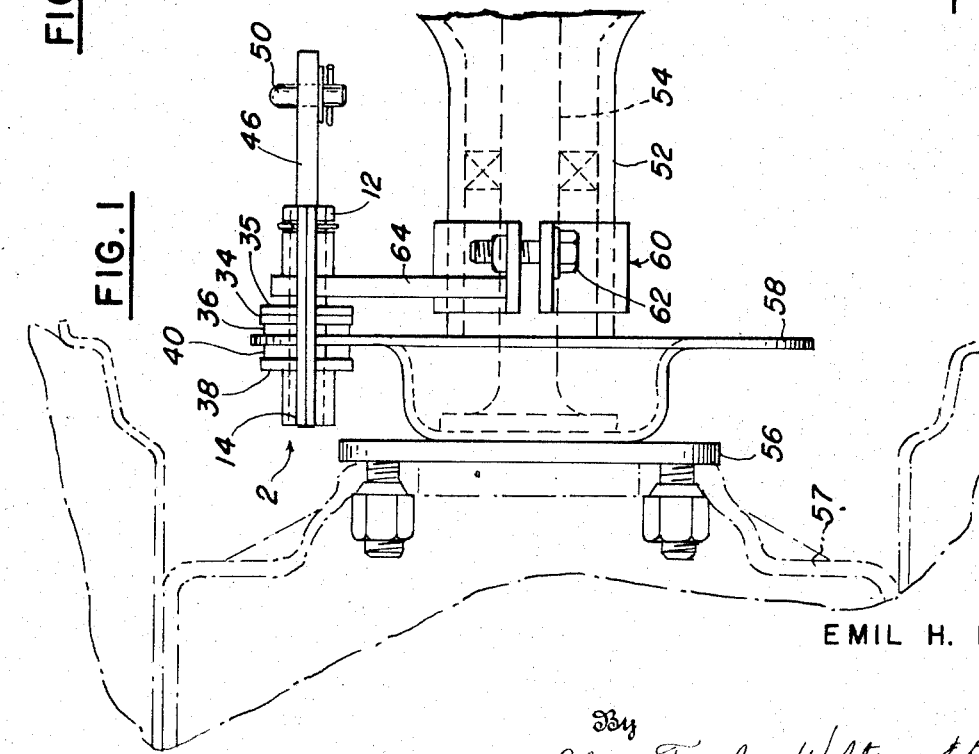
Inventor
EMIL H. HAHN

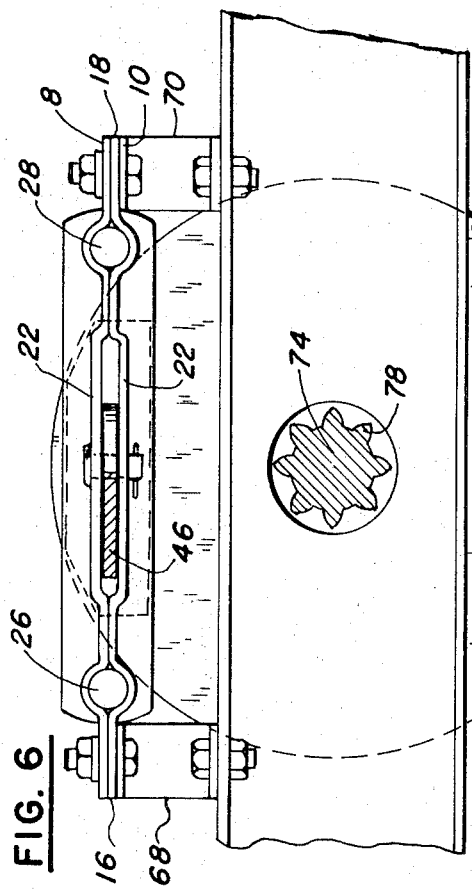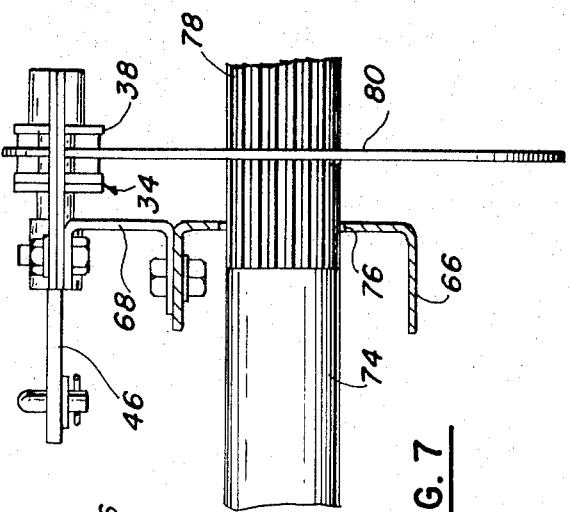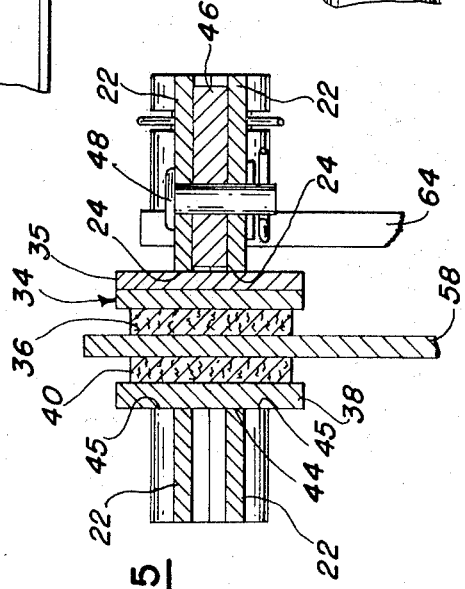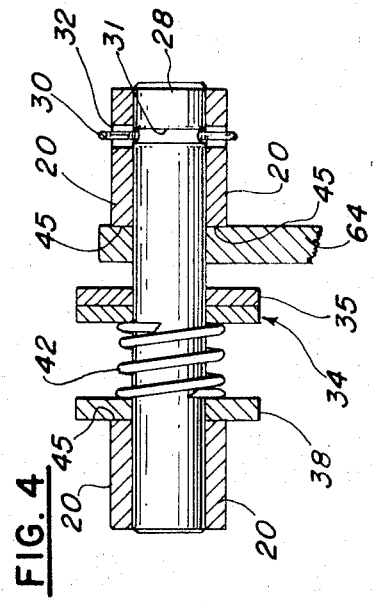

BRAKE

BACKGROUND OF THE INVENTION

This invention relates to improvements in a disc brake.

For reasons of safety, it is highly desirable that relatively low cost vehicles, such as garden tractors, off the road recreational vehicles, and the like, be provided with adequate braking. Efficient braking systems are known, but these often tend to be too expensive for practical use in such low cost vehicles.

OBJECTS AND SUMMARY OF THE INVENTION

It is an object of this invention to provide an inexpensive yet effective brake for vehicles of the foregoing type.

It is a further object of this invention to provide a brake of the type stated that can be readily adapted for mounting on a wide variety of existing small vehicles.

In accordance with the foregoing objects the brake of the present invention comprises an elongated ring-shaped housing that provides opposed flanges for supporting a pair of pins that span the ring-opening of the housing. The pins support a pair of braking plates which are slidably mounted thereon. Springs encircle the pins and bias the braking plates apart and into abutting relationship with the inside edges of the opposed flanges, respectively. The brake unit is mounted on a vehicle such that a rotating braking disc carried by a drive shaft or a wheel shaft thereof is disposed in the ring-opening and between the braking plates. An actuating lever is mounted on the housing whereby the brake plates may be caused to grip the opposite surfaces of the braking disc to stop the vehicle.

In one form of the invention in which the braking disc is constrained against axial movement, the housing and mechanism carried thereby is shiftably mounted on a support plate that is rigidly connected to the vehicle so that operation of the actuating lever causes one of the brake plates to engage the braking disc and also to cause the housing to shift and bring the other braking plate into engagement with the other side of the braking disc. In another form of the invention the housing is rigidly mounted on the vehicle and the rotating brake disc is axially slidable on the wheel or drive shaft so that in the braking operation one of the braking plates engages the brake disc and then pushes the brake disc axially to engagement with the other braking plate.

A feature of the invention that contributes to the ruggedness and simplicity of the unit is the housing, which is formed of two companion-shaped sheet metal members that are secured together in substantially face-to-face relationship. The companion members are each formed with channel-shaped bosses so that when the members are assembled the bosses cooperate to provide openings that receive the pins and also an additional opening between the pins for receiving the actuating lever, whereby the lever can project into the ring opening of the housing for engagement with one of the braking plates. The bosses formed in the housing also contribute to its rigidity. Also the effectively unitary construction of the ring-shaped housing allows it to take up the reactions to the braking and other forces without the need for bolts and spacers.

BRIEF DESCRIPTION OF THE FIGURES

In the drawing:

FIG. 1 is an elevational view of a disc brake constructed in accordance with and embodying the present invention;

FIG. 2 is a fragmentary top plan view;

FIGS. 3, 4, and 5 are sectional views taken along lines 3—3, 4—4, and 5—5 respectively of FIG. 2;

FIG. 6 is an elevational view of a modified form of brake as seen from the inboard side thereof; and FIG. 7 is a side elevational view of the structure of FIG. 6.

Like reference numerals indicate like parts throughout the drawing.

DETAILED DESCRIPTION

Referring now in more detail and by reference characters to the drawing, there is shown a brake unit 2 comprising an elongated ring-shaped housing 4 having a central or ring opening 6. The housing 4 is formed of companion ring-shaped sheet metal members 8, 10 that are secured as by welding in substantially face-to-face relationship to provide the housing with opposed flanges, namely an inboard flange 12 and an outboard flange 14. The ends of the flanges 12, 14 merge into and are thus integrally joined by side flanges 16, 18.

Each of the members 8, 10 is stamped or otherwise deformed out of the plane of the sheet to provide four channel-shaped bosses 20 of generally semi-cylindrical configuration and extending transversely of the parts of the members 8, 10 that make up the inboard and outboard flanges 12, 14. Between each pair of bosses 20 on each member 8, 10 there is a shallow boss 22, the inboard flange bosses 22 having edges 24, 24 (FIG. 5) which are inwardly offset from the adjacent inner edges of the inboard flange 12, for purposes presently more fully appearing. It will be seen, therefore, that when the members 8, 10 are secured together, the bosses 20 will provide the flanges 12, 14 with two pairs of axially aligned, generally cylindrical openings that receive spaced parallel support members or pins 26, 28. The pins 26, 28 are held against axial retraction from the openings in which they are positioned by spring retainers 30 (FIG. 4) that engage undercuts 31 in the pins 26, 28. For purposes of mounting the retainers 30 in place, the bosses 20 on the inboard flange 12 are formed with transverse slots 32.

Slidably mounted on the pins 26, 28 is an inboard braking plate 34 that includes a lining 36 of friction material. The braking plate may, if desired, also include a backing 35 for reinforcement thereof. The lining 36 may be bonded, riveted or otherwise suitably secured in place. Also slidably mounted on the pins 26, 28 is an outboard braking plate 38 having an inboard-facing lining 40. The braking plates 34, 38 are biased apart in the ring opening 6 by compression springs 42 that surround the pins 26, 28. The braking plates 34, 38 are approximately rectangular and project above and below the housing 4, and each lining 36, 40 is a somewhat trapezoidal element, the side edges of which are spaced from the pins 26, 28.

As best seen in FIG. 5, when the braking plates 34, 38 are biased apart, the braking plate 34 abuts the spaced apart edges 24, 24 on the bosses 22 of the flange 12, and the braking plate 38 abuts the inboard edges 44 of the outboard flange 14, which includes the spaced apart edge portions 45, 45 at the outboard flange bosses 22, 22. A brake actuating lever 46 is pivotally secured to the flange 12 by a pivot pin 48 that passes through the inboard flange bosses 22, 22. The lever 46 is disposed in the narrow opening formed by the inboard flange bosses 22, 22 and projects outwardly from the housing in a generally inboard direction at an acute angle to the length of the flange 12. The free end of the lever 46 is pivotally connected to an operating rod 50 that is operated directly or indirectly by the person operating the vehicle to shift the actuating lever 46 to and from the brake-engaged and brake-disengaged positions. It should be noted that the lever 46 is for applying braking load and is not used as a locator for the inboard braking plate 34.

If desired, a cover 47 may be mounted on the housing and secured to the side flanges 16, 18 as by screws 49, 49, as shown in FIG. 3. The cover is omitted from the other views for clarity.

In the form of the invention shown in FIGS. 1-3 the vehicle upon which the brake unit is mounted may include an axle housing 52 and containing a shaft 54 that is rigidly connected to a wheel hub 56. A wheel 57 is bolted to the wheel hub 56 in a conventional manner. Also rigidly secured to the shaft 54 is a member that includes a brake disc 58. A mounting bracket 60 is clamped by bolt and nut assemblies 62, 62 to the axle housing 52. The mounting bracket 60 includes an upwardly projecting mounting plate 64 which is apertured for slidably receiving the pins 26, 28 and is disposed between the flanges 12, 14 and adjacent to the inboard flange 12. The mounting plate 64 and associated mounting bracket 60 position the unit so that substantially a segment of the brake disc 58 lies between the lining portions 36, 40 of the braking plates 34, 38. When the brake is disengaged and the shaft 54 and disc 58 are rotating, the disc 58 will be clear of both of the lining portions 36, 40.

To apply the brake the rod 50 is moved to cause the actuating lever 46 to rotate counterclockwise as viewed in FIG. 2. The end of the lever 46 that is adjacent to the pivot pin 48 engages the backing 35 and urges the braking plate 34 toward the disc 58 in opposition to the springs 42. Upon engagement of the lining 36 with the disc 58 and further movement of the actuating lever 46, the housing 4 is pulled inboard until the lining 40 on the outboard braking plate 38 engages the disc 58 and thus stops the disc 58 from rotating. The aforesaid inboard movement of the housing 4 is permitted due to the slidable connection of the pins 26, 28 with the mounting plate 64. The brake is released by moving the lever 46 clockwise (FIG. 2) until the parts appear in the positions shown in the drawing.

In the form of the invention shown in FIGS. 6 and 7, the vehicle comprises a frame 66, and the housing 4 is secured to the frame 66 by brackets 68, 70. In a typical arrangement, the brackets 68, 70 may be secured to the housing by bolt and nut assemblies 72 that pass through the side flanges 16, 18 and thus rigidly secure the housing 4 to the frame 66. The wheel shaft 74 projects through a clearance hole 76 in the frame 66 and the shaft is formed with splines 78 for receiving a brake disc 80 having a central hole with companion-shaped splines so that the brake disc 80 is rotatable with the shaft 78 but is nevertheless axially shiftable therealong. The mechanism carried by the housing 2 is the same as that previously described. However, when the lever 46 is actuated to engage the brake, the lever 46 urges the inboard braking plate 34 toward the brake disc 80 until the latter is engaged by the lining 36 of the inboard braking plate 34. Further movement of the lever 46 causes the disc 80 to be axially shifted in an outboard direction until the disc 80 comes into engagement with the lining 40 of the outboard braking plate 38.

In connection with the present invention it should be noted that while the basic concept of the invention does not require the backing plate 35, it is useful in rigidifying the inboard braking plate 34. The backing plate 35 also provides a hardened wear surface for contact by the lever 46 to reduce contact wear.

When the brake is engaged, the outboard surface of the outboard braking plate 38 will be pressed against the inboard edges 44 of outboard flange 14. Since the inner edges 44 include the inner edges of the bosses 20, 22 on the flange 14, there is a substantial line or edge of contact that tends to back the braking plate 38 at spaced apart regions. This tends to assist the braking plate 38 in applying axial pressure to the brake disc 58 or 60.

The housing 4 is a self-contained low cost member that resists the braking and other forces applied thereto. For instance, the provision of the bosses 20, 22 serves the additional purpose of rigidifying the inboard and outboard flanges 12, 14 to resist buckling or bending under load. The ring-shaped or unitary housing construction results in the braking forces being resisted by tension in the side flanges 16, 18, which are of a double thickness of metal and provide great strength with small weight.

The invention is claimed as follows:

1. In a braking mechanism, opposed flanges, spaced side members joined to said opposed flanges to form a unitary ring-shaped housing, braking plates in the ring-opening of the housing, means mounting said braking plates for relative movement toward one another, means normally biasing said braking plates apart, and means for moving said braking plates relatively toward one another in opposition to the bias to apply a braking load to a moving member in said ring opening and at the same time apply force through one of said braking plates to one of said opposed flanges in a direction away from said other flange so that the braking load will be resisted by tension in said side members, said housing being formed by ring-shaped members secured in substantially face-to-face engagement, each member being of sheet material and having bosses deformed from the plane of the sheet, said bosses receiving pins that form part of said mounting means.

2. A brake comprising an endless ring-shaped housing, said housing being formed by companion ring-shaped members secured in face-to-face relationship to form opposed flanges that are integrally joined by side flanges, each ring-shaped member including channel-shaped bosses of arcuate configuration such that the secured members provide pairs of axially aligned openings at said opposed flanges and with the axis of one pair of openings being parallel to the axis of the other pair of openings, a support member mounted in each pair of aligned openings and spanning the space therebetween, spaced apart braking plates for engagement with a brake disc therebetween, said braking plates being mounted on said support members for relatively shifting movement toward and away from each other, resilient means biasing said braking plates away from each other, said opposed flanges supporting said plates in their positions away from each other in opposition to said resilient means, and actuator means operable in opposition to said resilient means for moving said braking plates relatively toward one another.

3. A brake according to claim 2 in combination with a mounting plate having means for rigid attachment to a vehicle, said support members passing through said mounting plate for mounting said housing shiftably thereon so that operation of said actuator means serves to shift one of said braking plates into engagement with said brake disc and also to shift said housing to bring the other braking plate into contact with said brake disc.

4. A brake according to claim 2 in combination with means for rigidly attaching said housing to a vehicle, and means slidably attaching said brake disc to said vehicle so that operation of said actuator means serves to shift one of said braking plates into engagement with said brake disc and also to shift said brake disc into engagement with the other braking plate.

5. A brake according to claim 2 including additional bosses on each ring-shaped member that cooperate to provide spaced edges on one of said opposed flanges for supporting a braking plate at spaced apart regions.

6. A brake according to claim 2 in which the housing has means defining an additional opening in one of said opposed flanges and intermediate said support members for receiving said actuating means.

7. A brake according to claim 6 in which said actuator means comprises a lever pivotally mounted on one of said opposed flanges and movable to apply force to one of said braking plates.

8. A brake according to claim 6 in which the means defining said additional opening comprises additional bosses on said ring-shaped members providing spaced edges for supporting a braking plate at spaced apart regions.

* * * * *